United States Patent
Moriyoshi

(10) Patent No.: US 9,264,715 B2
(45) Date of Patent: Feb. 16, 2016

(54) MOVING IMAGE ENCODING METHOD, MOVING IMAGE ENCODING APPARATUS, AND COMPUTER-READABLE MEDIUM

(75) Inventor: Tatsuji Moriyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 215 days.

(21) Appl. No.: 14/128,057

(22) PCT Filed: May 1, 2012

(86) PCT No.: PCT/JP2012/002953
§ 371 (c)(1),
(2), (4) Date: Dec. 20, 2013

(87) PCT Pub. No.: WO2012/176368
PCT Pub. Date: Dec. 27, 2012

(65) Prior Publication Data
US 2014/0161182 A1   Jun. 12, 2014

(30) Foreign Application Priority Data
Jun. 22, 2011   (JP) ................................. 2011-138120

(51) Int. Cl.
*H04N 11/02* (2006.01)
*H04N 19/85* (2014.01)
(Continued)

(52) U.S. Cl.
CPC ......... *H04N 19/00903* (2013.01); *H04N 19/11* (2014.11); *H04N 19/119* (2014.11); *H04N 19/174* (2014.11); *H04N 19/436* (2014.11); *H04N 19/593* (2014.11); *H04N 19/85* (2014.11)

(58) Field of Classification Search
CPC .......... H04N 19/00903; H04N 19/119; H04N 19/593; H04N 19/11; H04N 19/174; H04N 19/436; H04N 19/85
See application file for complete search history.

(56) References Cited

U.S. PATENT DOCUMENTS

| | | | |
|---|---|---|---|
| 2010/0027680 A1* | 2/2010 | Segall | H04N 19/119 375/240.24 |
| 2015/0237368 A1* | 8/2015 | Cho | H04N 19/436 375/240.16 |

FOREIGN PATENT DOCUMENTS

| | | |
|---|---|---|
| JP | 2000-224584 A | 8/2000 |
| JP | 2005-191706 A | 7/2005 |

(Continued)

OTHER PUBLICATIONS

International Telecommunication Union (ITU-T), "Series H: Audiovisual and Multimedia Systems; Infrastructure of audiovisual services—Coding of moving video; Advanced video coding for generic audiovisual services", ITU-T Recommendation H. 264, Mar. 2005.

(Continued)

*Primary Examiner* — Tat Chio
(74) *Attorney, Agent, or Firm* — Sughrue Mion, PLLC

(57) ABSTRACT

A slice division structure control unit (430) determines a slice division structure indicating a division position for dividing each picture into multiple slices. A pre-stage processing unit (410) performs pre-stage processing of encoding for each of multiple slice division structures that can be determined by the slice division structure control unit (430), and obtains processing results for each of the multiple slice division structures. A post-stage processing unit (420) selects, from among the processing results for each of the multiple slice division structures obtained by the pre-stage processing unit (410), a processing result matching a slice division structure (S) determined by the slice division structure control unit (430), and performs post-stage processing for encoding the picture based on the selected processing result. With this configuration, deterioration in image quality and efficiency can be avoided even when the slice division structure is dynamically changed during encoding of a moving image.

21 Claims, 13 Drawing Sheets

(51) Int. Cl.
*H04N 19/119* (2014.01)
*H04N 19/593* (2014.01)
*H04N 19/11* (2014.01)
*H04N 19/174* (2014.01)
*H04N 19/436* (2014.01)

(56) References Cited

FOREIGN PATENT DOCUMENTS

| JP | 2007-318726 A | 12/2007 |
| JP | 2009-141539 A | 6/2009 |

OTHER PUBLICATIONS

Keng-Pang Lim et al., "Text Description of Joint Mode Reference Encoding Methods and Decoding Concealment Methods", Joint Video Team (JVT) of ISO/IEC MPEG and ITU-T VCEG, Doc. JVT-O079, Apr. 13, 2005, pp. 1-40.

International Search Report for PCT Application No. PCT/JP2012/002953, mailed on Jul. 24, 2012.

\* cited by examiner

| MACROBLOCK NUMBER | SLICE DIVISION STRUCTURE | OPTIMUM MODE |
|---|---|---|
| N | S1 | 4 |
|  | S2 | 2 |
|  | S3 | 1 |
|  | S4 | 1 |
|  | S5 | 2 |
| N+1 | S1 | 6 |
|  | S2 | 0 |
|  | S3 | 8 |
|  | S4 | 8 |
|  | S5 | 2 |
| N+2 | S1 | 7 |
|  | S2 | 7 |
|  | S3 | 2 |
|  | S4 | 2 |
|  | S5 | 2 |
| N+3 | S1 | 5 |
|  | S2 | 3 |
|  | S3 | 1 |
|  | S4 | 1 |
|  | S5 | 2 |
| ... | ... | ... |

Fig. 5

MOVING IMAGE ENCODING METHOD, MOVING IMAGE ENCODING APPARATUS, AND COMPUTER-READABLE MEDIUM

This application is a National Stage Entry of PCT/JP2012/002953 filed May 1, 2012, which claims priority from Japanese Patent Application 2011-138120 filed Jun. 22, 2011, the contents of all of which are incorporated herein by reference, in their entirety.

TECHNICAL FIELD

The present invention relates to a moving image encoding technique, and more particularly, to a technique for encoding a moving image by performing slice division on the moving image.

BACKGROUND ART

In recent years, a moving image encoding technique has been widely used. The moving image encoding technique has been used for a wide range of applications such as digital broadcasting, video content distribution via an optical disk, and video distribution via the Internet and the like. As techniques for generating encoded data by encoding a moving image signal at a low bit rate, a high compression ratio, and a high image quality and for decoding the encoded moving image, H.261 and H.263, which are standardized by the ITU (International Telecommunication Union), MPEG-1, MPEG-2, and MPEG-4, which are ISO (International Organization for Standardization) standards, VC-1, which is a SMPTE (Society of Motion Picture and Television Engineers) standard, and the like are used as the international standards.

In addition, H.264/MPEG-4 AVC (hereinafter referred to as "H.264") which has been recently standardized by the ITU and ISO is known (Non Patent Literature 1). It is known that H.264 further improves the compression efficiency and image quality, as compared with moving image encoding techniques of related art.

To meet the demand for improving the video quality and reducing the transmission rate, the encoding techniques are complicated and the load of encoding processing increases. Accordingly, for example, real-time encoding of a full-high-vision (1920×1080 pixels) video in an H.264 system, which is the latest international standard system, cannot be achieved using only typical CPU software, and some accelerator is also used in practice. As a desirable accelerator in a platform of a PC (personal computer), a GPGPU (General Purpose Computing on Graphics Processing Unit) is known. In the GPGPU, a GPU (Graphics Processing Unit), which has been used for three-dimensional graphics processing, is used for other purposes as well. The GPGPU can perform processing matching the characteristics of the GPU, which exhibits an extremely high performance in large-scale vector operation, at a speed several to several tens of times faster than a CPU.

FIG. 8 shows a typical example of a moving image encoding apparatus of an H.264 system. As shown in the figure, a moving image encoding apparatus 100 includes a motion estimation unit 101, a motion compensation unit 102, an intra prediction mode determination unit 103, an intra prediction unit 104, a selection unit 105, an integer transform unit 106, a quantization unit 107, an inverse quantization unit 108, an inverse discrete integer transform unit 109, a variable-length coding unit 110, a deblocking filter unit 111, a frame buffer 112, a subtraction unit 113, and an addition unit 114. The moving image encoding apparatus 100 sequentially encodes each input image (hereinafter referred to as "input image") to obtain a bit stream and outputs the obtained bit stream. In the moving image encoding apparatus 100, processing of all functional blocks is executed by a CPU.

In order to improve the compression efficiency and image quality, the H.264 system also employs the intra prediction (in-screen prediction) technique that performs a prediction using information on neighboring pixels within an image, and the technique of a deblocking filtering for reducing encoding noise caused in an image obtained as a result of encoding. The frame buffer 112 stores image data of previously encoded frames. Encoding processing is performed on the input image in the unit of a block of 16×16 pixels. The block is called a macroblock (MB).

The motion estimation (ME: Motion Estimation) unit 101 detects a change in the position of the corresponding image block between an input image and an encoded image stored in the frame buffer 112, and outputs motion vector information corresponding to the position change. The motion compensation (MC: Motion Compensation) unit 102 performs motion compensation processing using the encoded image stored in the frame buffer 112 and the motion vector information supplied from the motion estimation unit 101, and outputs a motion compensation prediction image.

The intra prediction mode determination unit 103 selects an appropriate intra prediction mode based on the input image and image information on the encoded macroblock within the input image, and outputs information (intra prediction mode information) indicating the selected mode. The intra prediction (IP: Intra Prediction) unit 104 performs intra prediction processing using the image information on the encoded macroblock within the input image and the intra prediction mode information supplied from the intra prediction mode determination unit 103, and outputs an intra prediction image.

The selection unit 105 selects an appropriate one of either the motion compensation prediction image, which is supplied from the motion compensation unit 102, or the intra prediction image, which is supplied from the intra prediction unit 104, and outputs the selected image as a predicted image. A mode for selecting the motion compensation prediction image is called an inter mode, and a mode for selecting the intra prediction image is called an intra mode.

The subtraction unit 113 subtracts the predicted image, which is output from the selection unit 105, from the input image, and outputs a prediction error image. The integer transform (DIT: Discrete Integer Transform) unit 106 performs orthogonal transform processing similar to that performed by DCT (Discrete Cosine Transform) on the prediction error image to obtain an orthogonal transform coefficient sequence, and outputs the obtained orthogonal transform coefficient sequence.

The quantization (Q: Quantize) unit 107 quantizes the orthogonal transform sequence from the integer transform unit 106, and outputs the quantized orthogonal transform coefficient sequence.

The variable-length coding (VLC: Variable-Length Coding) unit 110 encodes the quantized orthogonal transform coefficient sequence, which is supplied from the quantization unit 107, according to a predetermined rule, and outputs a bit stream of encoding results. This bit stream is an output bit stream of the encoding apparatus of the H.264 system.

The orthogonal transform coefficient sequence quantized by the quantization unit 107 is also output to the inverse quantization (IQ: Inverse Quantization) unit 108, and is subjected to inverse quantization processing by the inverse quantization unit 108 and then subjected to inverse discrete integer transform processing by the inverse discrete integer transform (IDIT: Inverse Discrete Integer Transform) unit 109. Then, the orthogonal transform coefficient sequence is added to the predicted image, which is output from the selection unit 105, by the addition unit 114, and is further subjected to deblocking filtering processing by the deblocking filter unit 111. Data obtained by the deblocking filter unit 111 is a local decoded image to be stored in the frame buffer 112 and used for encoding of the subsequent frame.

The intra prediction mode determination unit 103 and the selection unit 105 employ various selection methods. However, in general, the intra prediction mode determination unit 103 and the selection unit 105 select one having a higher encoding efficiency.

The contents of the above-mentioned processing of the functional blocks of the moving image encoding apparatus 100 are also disclosed in Non Patent Literature 2, for example, so a detailed description thereof is omitted.

In each functional block of the moving image encoding apparatus 100 shown in FIG. 8, in general, the throughputs for the motion estimation performed by the motion estimation unit 101 and the intra prediction mode determination performed by the intra prediction mode determination unit 103 are especially high. Accordingly, the processing of the motion estimation and intra prediction mode determination is off-loaded to an accelerator, such as a GPU, thereby achieving speeding-up of the processing. The case where the motion estimation and intra prediction mode determination are off-loaded to the GPU will be described with reference to FIG. 9.

FIG. 9 shows an example of the configuration of the moving image encoding apparatus in which the respective processings of the motion estimation unit 101, the intra prediction mode determination unit 103, and the motion compensation unit 102, which uses the results of the motion estimation performed by the motion estimation unit 101, as shown in FIG. 8, are off-loaded to the GPU and the subsequent respective processings are executed by the CPU. To facilitate comparison with FIG. 8, functional blocks having the same function are denoted by the same reference numerals in FIGS. 9 and 8.

As shown in FIG. 9, in a moving image encoding apparatus 200, the GPU executes the respective processings of the motion estimation unit 101, an intra prediction mode determination unit 203, and the motion compensation unit 102. Other respective processings are executed by the CPU.

In the moving image encoding apparatus 200, the intra prediction mode determination unit 203 that performs an intra prediction mode determination is different from the intra prediction mode determination unit 103 of the moving image encoding apparatus 100. The reason for this will be described below.

Since it generally takes a long time to perform data communication between a CPU and a GPU, the processing results can be collectively transferred from the CPU to the GPU by a certain amount, for example, by an amount corresponding to one screen. Specifically, the GPU performs motion estimation, motion compensation, and intra prediction mode determination processing for one screen, and collectively transfers the processing results for one screen to the CPU. The CPU performs the subsequent processing for the one screen. In this case, the intra prediction mode determination unit 203 cannot use the image information on the encoded macroblocks within the same image. Accordingly, unlike the intra prediction mode determination unit 103 of the moving image encoding apparatus 100, the intra prediction mode determination unit 203 operates to select an appropriate intra prediction mode by using only the information on the input image.

In the moving image encoding apparatus 200, the intra prediction mode determination processing is performed by the GPU, but the intra prediction processing using the result is executed by the CPU as in the moving image encoding apparatus 100. This is because the result of DIT-Q-IQ-IDIT processing on an image block adjacent to the image block (having a size of 16×16 pixels, 8×8 pixels, or 4×4 pixels) which is being processed is required for intra prediction.

In many cases, patterns that are spatially analogous to each other are continuously formed in normal images. For this reason, in the H.264 intra prediction, the image data of the block adjacent to the block to be processed is duplicated to predict the image of the block to be processed, thereby obtaining a high prediction effect. To deal with various types of patterns, prediction modes in nine directions as shown in FIG. 10 are used in the case of 4×4 blocks, for example. The intra prediction mode determination is processing for determining a mode indicating an optimum prediction result from among the nine modes. The prediction results of the nine modes are evaluated in each block of an image and the optimum mode is selected, which results in an increase in throughput. In this case, images located outside the screen cannot be used as a prediction source, so the operation of intra prediction is changed at an end of the screen and at a boundary of division when the screen is divided. At an upper end of the screen, for example, the modes 0, 3, 4, 5, 6, and 7, in which the upper-side image is used, cannot be selected. When the mode 2 is selected, a special operation is carried out.

As disclosed in Patent Literatures 1 and 2, for example, H.264 enables division of a screen into small regions, each of which is called a slice, thereby encoding each slice separately. In this case, images located outside each slice cannot be used as a prediction source, so the operation of intra prediction is also changed at the boundary between slices in the same manner as described above.

Processing for dividing a screen into slices to be encoded will be described in detail with reference to a moving image encoding apparatus 300 of related art shown in FIG. 11. For ease of understanding, in FIG. 11, the processing configuration is limited to that when the intra mode, i.e., the intra prediction image, is selected. The subtraction unit 113, the integer transform unit 106, the quantization unit 107, the inverse quantization unit 108, the inverse discrete integer transform unit 109, the addition unit 114, and the variable-length coding unit 110, which are provided in the moving image encoding apparatus 100 shown in FIG. 8, are integrated into a block encoding unit 303. A slice division structure control unit 301 is added to explain the operation using a slice.

As shown in FIG. 11, an intra prediction mode determination unit 310 includes an optimum mode determination unit 320. The optimum mode determination unit 320 determines an appropriate intra prediction mode by using information on an input image and information on the slice division structure of the screen supplied from the slice division structure control unit 301, and outputs intra prediction mode information.

An intra prediction unit 302 performs intra prediction processing using the intra prediction mode information supplied from the intra prediction mode determination unit 310, information on the slice division structure of the screen supplied from the slice division structure control unit 301, and information on an encoded image supplied from an encoded image storage unit 304, and outputs an intra prediction image.

The block encoding unit 303 performs a series of encoding processing, such as DIT-Q-IQ-IDIT, by using the input image and the intra prediction image supplied from the intra prediction unit 302, and outputs a bit stream and an encoded image.

The encoded image storage unit 304 stores the encoded image supplied from the block encoding unit 303.

The slice division structure control unit 301 determines a slice division position by using the bit stream output from the block encoding unit 303, and outputs information on the slice division structure of the screen.

The encoding by slice division is effective for reducing the effect of transmission line errors when video communication is performed using a transmission line in which an error occurs. A variable-length code is used as a bit stream in H.264 and the like. Accordingly, if a bit error occurs due to a transmission line error or the like, bit streams following the position where the bit error occurs cannot be normally decoded, so that the effect of the bit error propagates through the subsequent region of the screen. FIG. 12 is a diagram for explaining the range affected by the error.

The left side of FIG. 12 shows the range affected by the error when slice division is not performed. As shown in the figure, in this case, the effect of the error covers the whole region below the position where the error occurs. On the other hand, as shown on the right side of FIG. 12, when slice division is performed, the effect of the error is limited to the inside of the slice in which the error occurs.

In the case of using an IP (Internet Protocol) network as a transmission line, slice division is generally performed so that the data size of one slice falls within Path MTU (which is a maximum data size that can be transmitted by one packet). This is because if the slice is present across a plurality of packets, the error rate due to a packet loss increases. Therefore, in the case of encoding a moving image, dynamic slice division processing is performed in which the data size of a bit stream obtained as a result of encoding is monitored and when the size of data included in one slice exceeds a predetermined value, the slice is further divided. The slice division structure control unit 301 of the moving image encoding apparatus 300 performs this dynamic slice division processing.

CITATION LIST

Patent Literature

[Patent Literature 1] Japanese Unexamined Patent Application Publication No. 2007-318726
[Patent Literature 2] Japanese Unexamined Patent Application Publication No. 2005-191706

Non Patent Literature

[Non Patent Literature 1] ITU-T Recommendation H.264 "Advanced video coding for generic audiovisual services", March 2005
[Non Patent Literature 2] Joint Video Team (JVT) of ISO/IEC MPEG and ITU-T VCEG, Document JVT-0079, "Text Description of Joint Mode Reference Encoding Method and Decoding Concealment Method", April 2005

SUMMARY OF INVENTION

Technical Problem

Now, the case where processing with a large load is offloaded to the GPU as in the moving image encoding apparatus 200 shown in FIG. 9 and slice division is performed as in the moving image encoding apparatus 300 shown in FIG. 11 will be considered. In this case, in the moving image encoding apparatus 300 shown in FIG. 11, the processing of the intra prediction mode determination unit 310 is performed by the GPU and the processing of other functional blocks including the slice division structure control unit 301 is performed by the CPU as shown in FIG. 13.

As described above, the GPU processes one screen and collectively transmits the processing results for the one screen to the CPU. In this case, even when the CPU controls the slice division, the processing for the one screen has already been completed in the intra prediction mode determination performed by the GPU. This poses a problem that the results of the slice division cannot be fed back for the intra prediction mode determination.

Assuming a certain slice division structure, for example, the GPU collectively determines the optimum intra prediction mode in the structure for the one screen and sends the results to the CPU. The CPU performs intra prediction based on the intra prediction mode information from the GPU and performs block encoding processing. Further, the CPU performs variable-length coding on the processing result and outputs a bit stream. For the dynamic slice division, the CPU monitors the data size of the output bit stream, and performs slice division when the data size exceeds the predetermined value.

As described above, the operation of intra prediction is changed at the boundary between slices. Accordingly, when the slice division structure is changed by the dynamic slice division, it is originally necessary to perform the intra prediction mode determination processing again based on a new slice division structure. However, since the processing for the one screen has already been completed, it is difficult to perform the intra prediction mode determination again. In theory, it is possible to perform the intra prediction mode determination again, but there is a problem that the efficiency deteriorates due to an increase in cost of the communication between the CPU and the GPU and an increase in the number of operations as a result of performing the processing again, for example. On the other hand, when the results of the intra prediction mode determination performed based on a slice division structure different from that determined by the CPU are used as they are, there is a problem that data (bit stream) which is non-compliant with the standards can be generated, or the image quality significantly deteriorates, for example.

The present invention has been made in view of the above-mentioned circumstances, and provides a moving image encoding technique that can avoid deterioration in image quality and efficiency even when a slice division structure is dynamically changed.

Solution to Problem

An exemplary aspect of the present invention is a moving image encoding apparatus that encodes each picture by dividing the picture into a plurality of slices. The moving image encoding apparatus includes a slice division structure control unit, a pre-stage processing unit, and a post-stage processing unit.

The slice division structure control unit determines a slice division structure indicating a division position for dividing a picture into a plurality of slices.

The pre-stage processing unit performs pre-stage processing which is processing for a pre-stage portion for encoding the picture. The pre-stage processing can yield different processing results for different slice division structures.

The post-stage processing unit performs post-stage processing, which is processing for a post-stage portion for encoding, based on the processing result of the pre-stage processing unit, and obtains an encoding result.

The pre-stage processing unit performs the pre-stage processing for each of a plurality of slice division structures that can be determined by the slice division structure control unit, and obtains processing results for each of the plurality of slice division structures.

The post-stage processing unit selects, from among the processing results for each of the plurality of slice division structures obtained by the pre-stage processing unit, a processing result matching a slice division structure determined by the slice division structure control unit, and performs the post-stage processing based on the selected processing result.

Note that implementations of the apparatus according to the above-mentioned aspect in the form of a system and a method, and a program for causing a computer to execute processing as the apparatus, and the like may also be effective as aspects of the present invention.

Advantageous Effects of Invention

The technique according to the present invention can avoid deterioration in image quality and efficiency even when a slice division structure is dynamically changed during moving image encoding.

BRIEF DESCRIPTION OF DRAWINGS

FIG. 5 is a diagram showing an example of processing results that are output to a post-stage processing unit by an intra prediction mode determination unit in the moving image encoding apparatus shown in FIG. 3;

DESCRIPTION OF EMBODIMENTS

Figure 1:
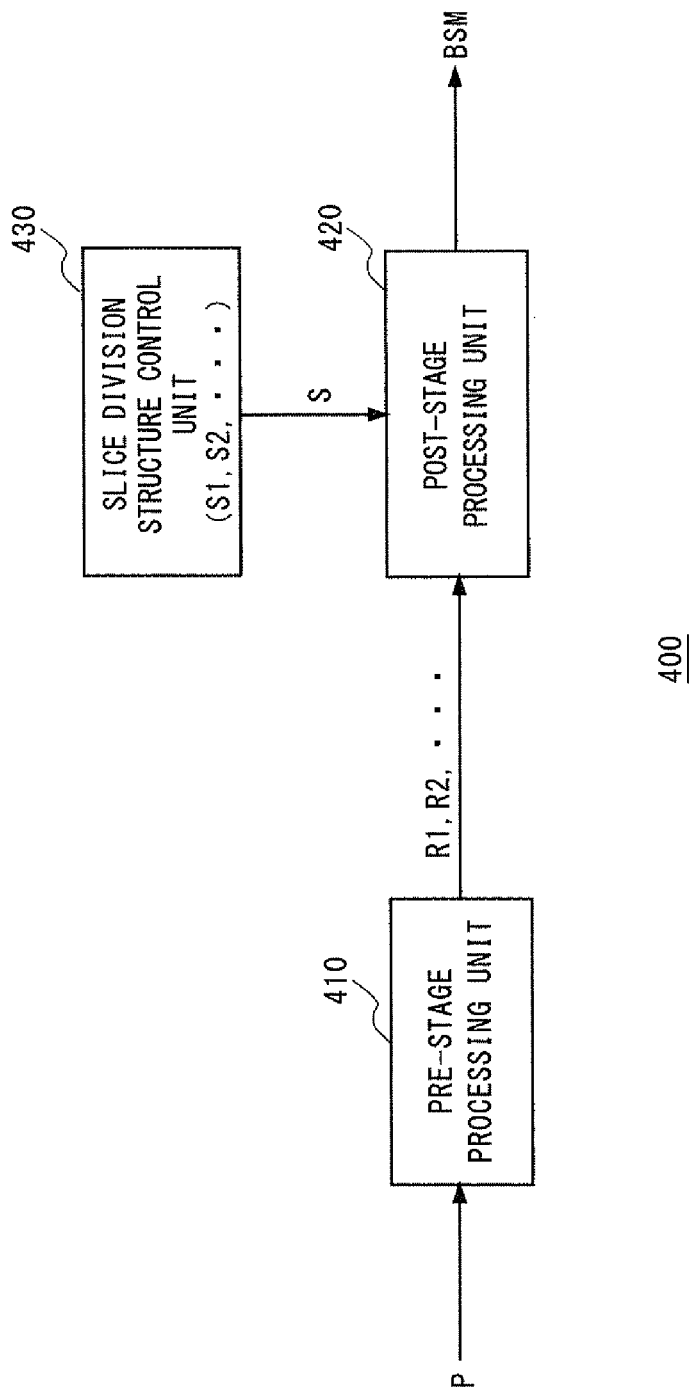
FIG. 1 is a diagram for explaining the technical principle according to the present invention.

Exemplary embodiments of the present invention will be described below with reference to the drawings. The following description and the drawings are abbreviated and simplified as appropriate for clarity of explanation. The elements illustrated in the drawings as functional blocks for performing various processes can be implemented hardwarewise by a CPU, a memory, and other circuits, and softwarewise by a program loaded onto a memory or the like. Accordingly, it is to be understood by those skilled in the art that these functional blocks can be implemented in various forms including, but not limited to, hardware alone, software alone, and a combination of hardware and software. Note that in the drawings, the same elements are denoted by the same reference numerals, and a repeated description is omitted as needed.

The above-mentioned program can be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer-readable media. Examples of transitory computer-readable media include electric signals, optical signals, and electromagnetic waves. Transitory computer-readable media can provide the program to a computer via a wired communication line, such as electric wires and optical fibers, or a wireless communication line.

Prior to a detailed description of exemplary embodiments of the present invention, the principle of the technique according to the present invention will be first described with reference to a moving image encoding apparatus 400 shown in FIG. 1.

The moving image encoding apparatus 400 shown in FIG. 1 encodes a moving image for each picture P (frame or field) to obtain a bit stream BSM as an encoding result. During encoding, the picture P is divided into a plurality of slices and each slice is encoded. In the following description, a division position for dividing the picture P into a plurality of slices is referred to as "slice division structure". The term "slice" refers to a region including at least one macroblock (hereinafter also referred to simply as "MB") which is a unit of encoding.

The moving image encoding apparatus 400 includes a pre-stage processing unit 410, a post-stage processing unit 420, and a slice division structure control unit 430.

The pre-stage processing unit 410 performs processing of a pre-stage portion (pre-stage processing) for encoding the picture P. The pre-stage processing can yield different processing results for different slice division structures. For example, as described above, in the case of performing encoding in conformity with the H.264 standard, the slice boundary varies depending on the slice division structure, so the intra prediction mode that can be selected upon determination of the intra prediction mode also varies. Accordingly, this pre-stage processing can be processing including determination of the intra prediction mode.

The post-stage processing unit 420 performs processing for a post-stage portion (post-stage processing) for encoding the picture P, and performs the post-stage processing based on the processing result of the pre-stage processing unit 410.

The slice division structure control unit 430 determines the division position to divide the picture P, i.e., the slice division structure. The slice division structure control unit 430 determines a slice division structure S from among a plurality of slice division structures (S1, S2, . . . ) and notifies the post-stage processing unit 420 of the determined slice division structure.

The pre-stage processing unit 410 performs the pre-stage processing for each of the plurality of slice division structures S1, S2, . . . , which can be determined by the slice division structure control unit 430, and obtains processing results (R1, R2, . . . ) for each of the plurality of slice division structures. For example, in the case of performing determination of the intra prediction mode as the pre-stage processing, the pre-stage processing unit 410 determines the intra prediction mode of each MB for each of the plurality of slice division structures, and outputs, to the post-stage processing unit 420, intra prediction mode information indicating the determined intra prediction mode.

The post-stage processing unit 420 selects the processing result that matches the slice division structure S determined by the slice division structure control unit 430, from among the processing results (R1, R2, . . . ) for each of the plurality of slice division structures obtained by the pre-stage processing unit 410, and performs the post-stage processing based on the selected processing result.

For example, when the pre-stage processing unit 410 obtains the intra prediction mode information for each of the plurality of slice division structures that can be determined by the slice division structure control unit 430, the post-stage processing unit 420 selects the intra prediction mode information corresponding to the slice division structure S, which is determined by the slice division structure control unit 430, from the intra prediction mode information for each of the plurality of slice division structures from the pre-stage processing unit 410, and performs, as the post-stage processing, intra prediction of the MB in the intra prediction mode indicated by the selected intra prediction mode information.

Specifically, in the moving image encoding apparatus 400, the pre-stage processing unit 410 performs the pre-stage processing for each of the plurality of slice division structures that can be determined by the slice division structure control unit 430, and outputs the processing results (R1, R2, . . . ) for each of the slice division structures to the post-stage processing unit 420, and the post-stage processing unit 420 selects the processing result corresponding to the slice division structure S determined by the slice division structure control unit 430 from among the plurality of processing results. Accordingly, even when the slice division structure control unit 430 dynamically changes the slice division structure, there is no need for the pre-stage processing unit 410 to perform the pre-stage processing again, and the entire moving image encoding apparatus has a high efficiency. Further, the post-stage processing unit 420 selects the processing result of the pre-stage processing unit 410 corresponding to the slice division structure S, which is actually determined by the slice division structure control unit 430, and performs the post-stage processing, thereby preventing deterioration in the image quality.

Note that the slice division structure control unit 430 can dynamically change the slice division structure. Any conventionally-known method for changing the slice division structure can be used. For example, in the case of a system that transmits the bit stream BSM by packet communication via an IP network, the slice division structure control unit 430 may monitor the data size of the bit stream BSM and determine the slice division structure such that the data size of one slice is equal to or smaller than a predetermined threshold that is smaller than the packet size.

According to the technique of the present invention, when a part of the processing for encoding a moving image is off-loaded to another device (for example, a GPU) other than the CPU, the effect of preventing deterioration in the efficiency is more remarkable. This will be described with reference to FIG. 2. Note that in FIG. 2, the components having the same functions as those of the functional blocks shown in FIG. 1 are denoted by the same reference numerals as those of the functional blocks shown in FIG. 1.

Figure 2:
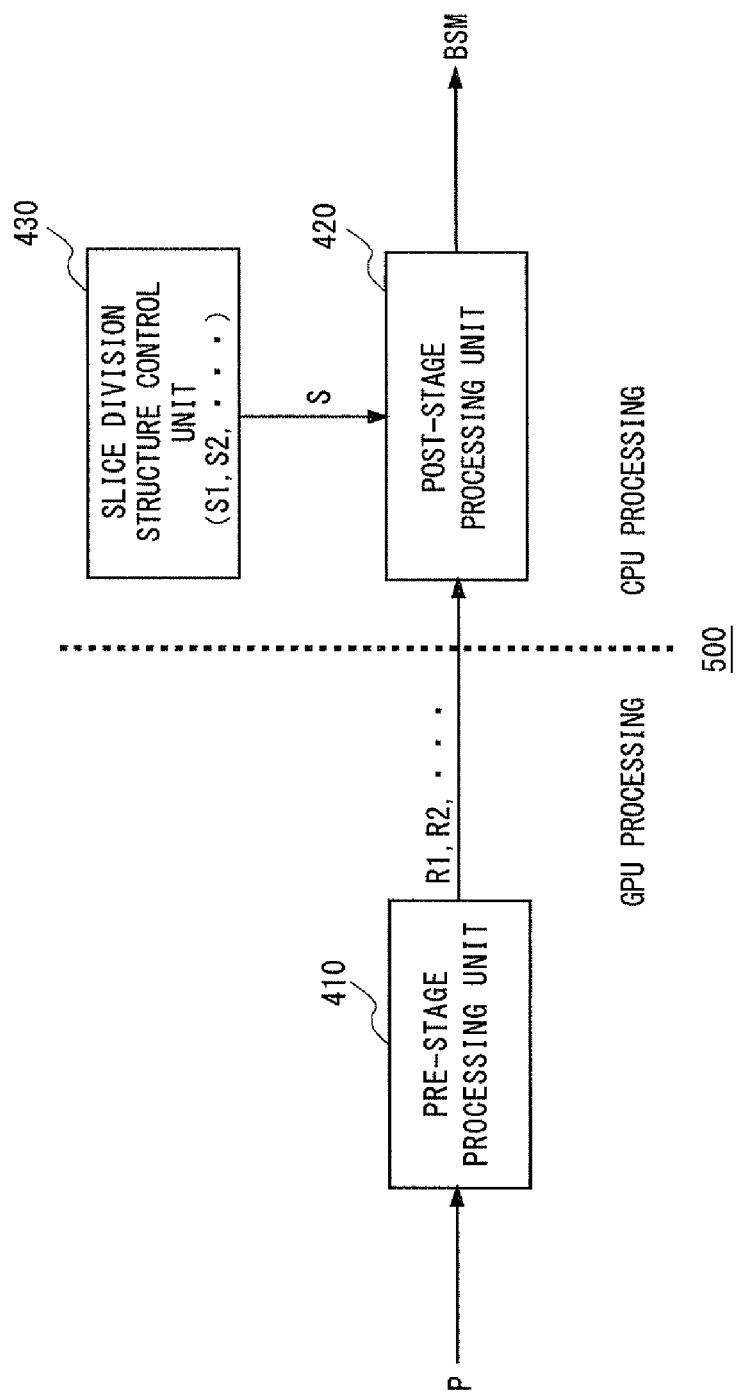
FIG. 2 is a diagram for explaining a case where pre-stage processing in a moving image encoding apparatus shown in FIG. 1 is off-loaded to a GPU.

As with the moving image encoding apparatus 400 shown in FIG. 1, a moving image encoding apparatus 500 shown in FIG. 2 includes the pre-stage processing unit 410, the post-stage processing unit 420, and the slice division structure control unit 430.

Among these functional blocks, the pre-stage processing unit 410 is provided in the GPU, and the post-stage processing unit 420 and the slice division structure control unit 430 are provided in the CPU. That is, the processing executed by the pre-stage processing unit 410 is off-loaded to the GPU from the CPU.

In this case, the pre-stage processing unit 410 needs to transmit the result of the pre-stage processing to the post-stage processing unit 420, so communication is performed between the GPU and the CPU. In this case, to save the communication time, the pre-stage processing unit 410 is configured to collectively transmit the results of the pre-stage processing for one screen to the post-stage processing unit 420 during one communication.

In the pre-stage processing unit 410, the pre-stage processing results for one screen include the pre-stage processing results respectively corresponding to the plurality of slice division structures that can be determined by the slice division structure control unit 430. Accordingly, the post-stage processing unit 420 selects the processing result corresponding to the slice division structure S, which is actually determined by the slice division structure control unit 430, from among these processing results, and performs the post-stage processing. Accordingly, even when the slice division structure control unit 430 dynamically changes the slice division structure S, there is no need to receive the result of the pre-stage processing corresponding to the changed slice division structure S again from the pre-stage processing unit 410. Therefore, when the processing of the pre-stage processing unit 410 is off-loaded from the CPU to the GPU, the same effect as that of the moving image encoding apparatus 400 can be obtained, and there is no need to establish communication again, which is more advantageous in terms of improvement of the efficiency.

On the basis of the principle described above, exemplary embodiments in which the technique of the present invention is embodied will be described.

First Exemplary Embodiment

Figure 3:
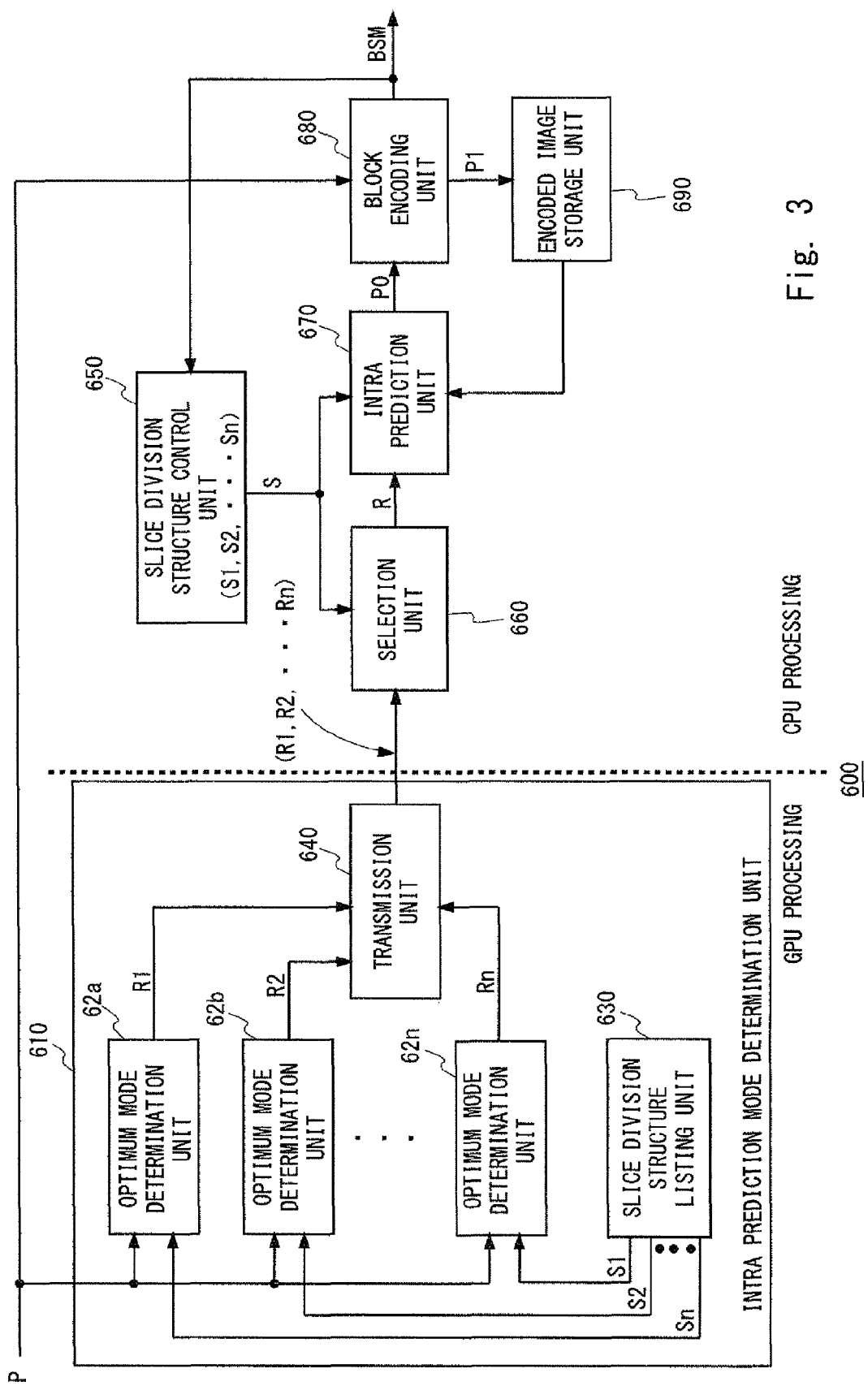
FIG. 3 is a diagram showing a moving image encoding apparatus according to a first exemplary embodiment of the present invention.

FIG. 3 shows a moving image encoding apparatus 600 according to a first exemplary embodiment of the present invention. The moving image encoding apparatus 600 encodes a picture P which is an H.264 input image. The moving image encoding apparatus 600 includes an intra prediction mode determination unit 610, a slice division structure control unit 650, a selection unit 660, an intra prediction unit 670, a block encoding unit 680, and an encoded image storage unit 690. Among these functional blocks, the intra prediction mode determination unit 610 is implemented by causing a GPU to execute a program, and other functional blocks are implemented by causing a CPU to execute a program.

Figure 8:
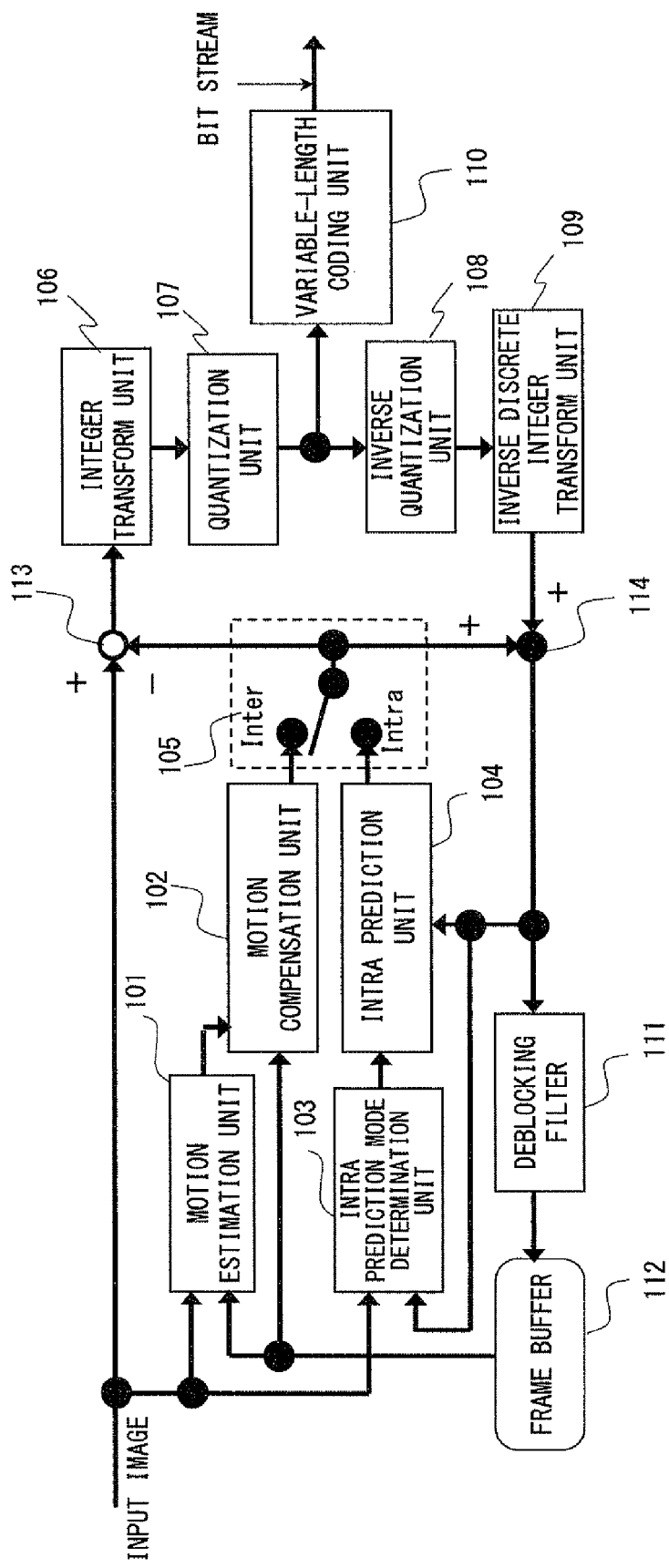
FIG. 8 is a diagram showing an example of a typical moving image encoding apparatus of an H.264 system.
Figure 9:
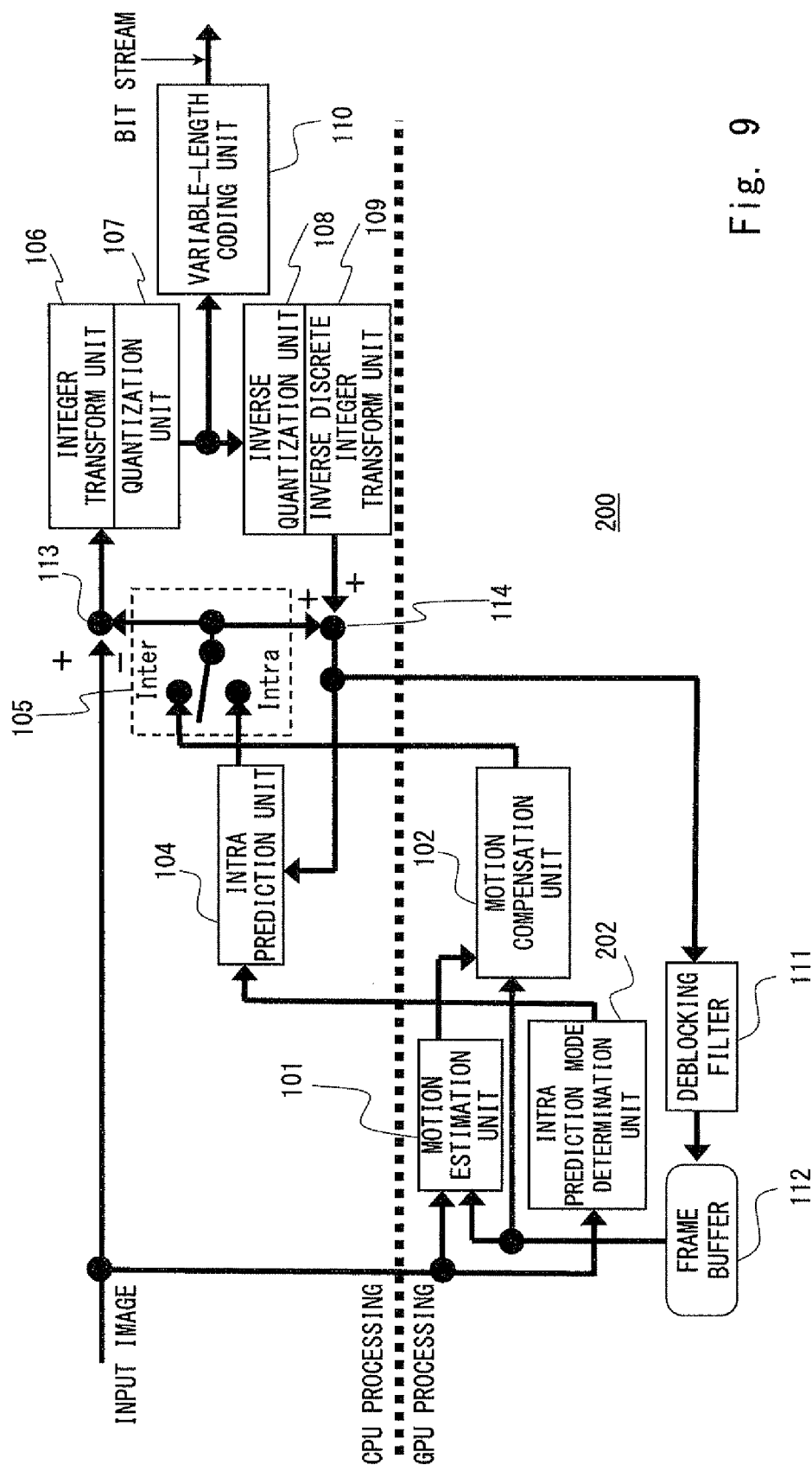
FIG. 9 is a diagram for explaining a case where a part of the processing of the moving image encoding apparatus shown in FIG. 8 is off-loaded to a CPU.
Figure 11:
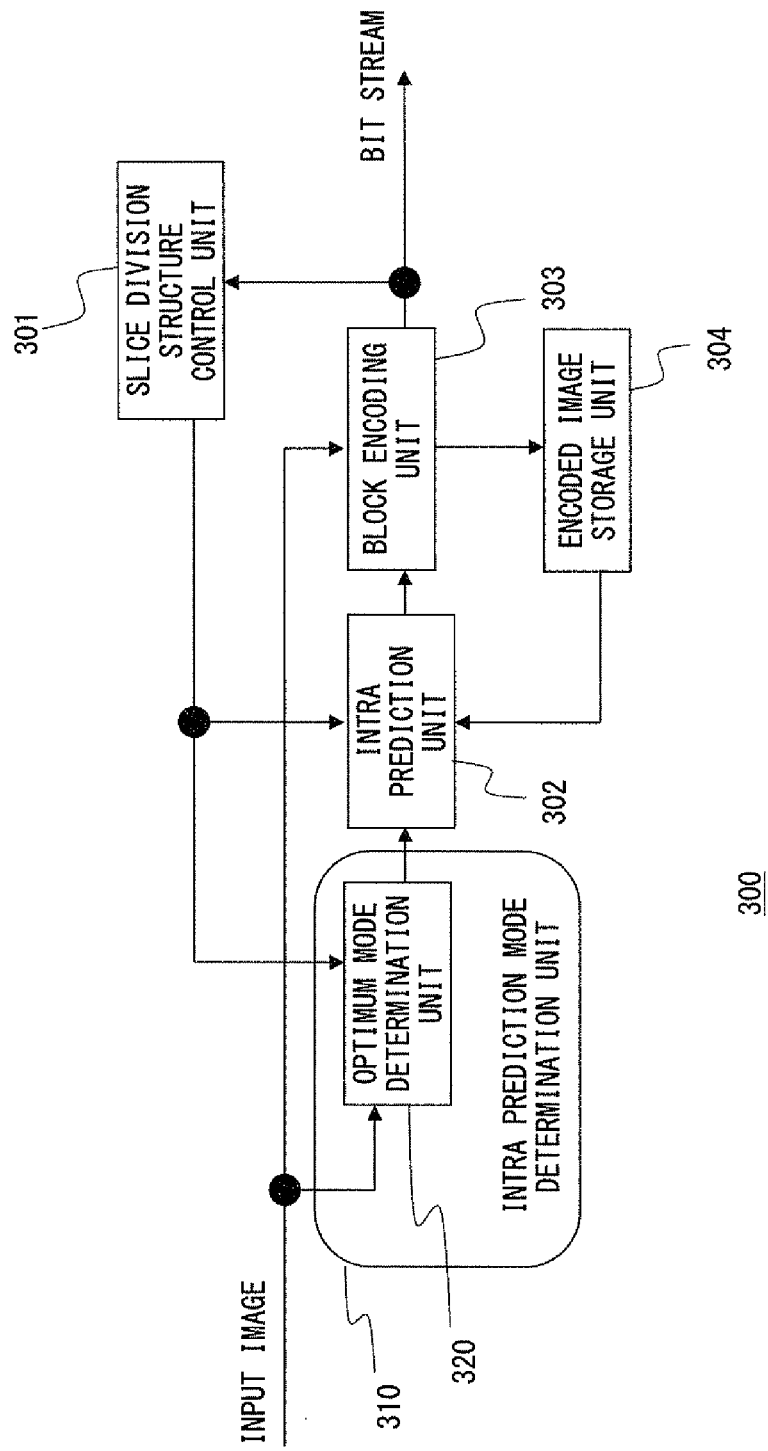
FIG. 11 is a schematic diagram showing an example of a moving image encoding apparatus that performs slice division.
Figure 12:
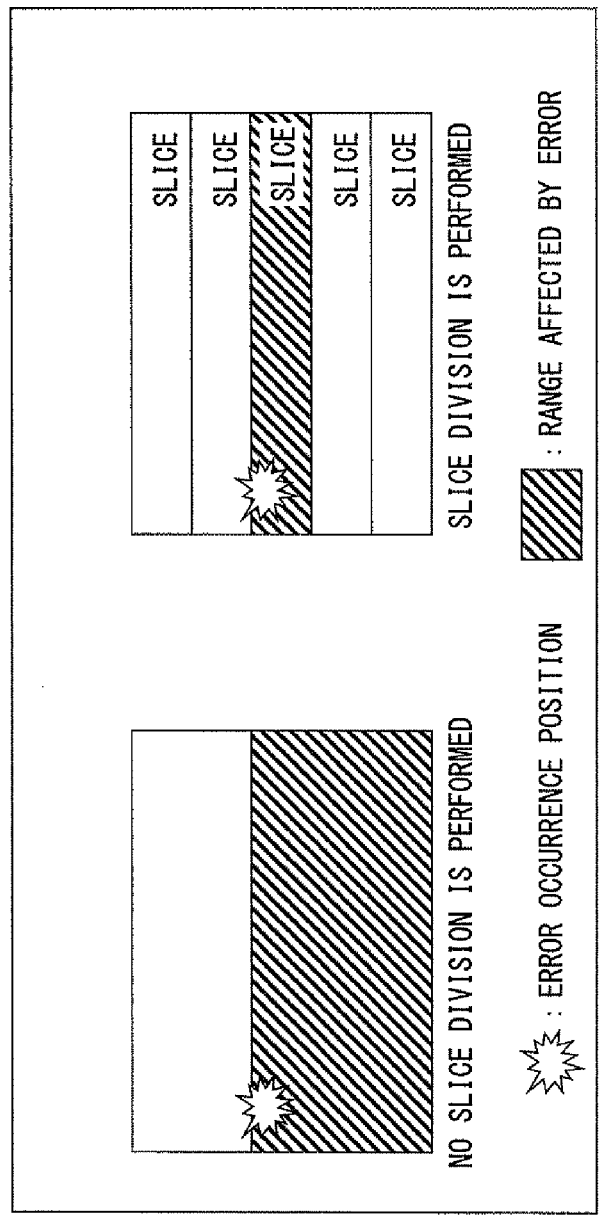
FIG. 12 is a diagram for explaining a difference in error influence range between a case where slice division is performed and a case where slice division is not performed.
Figure 13:
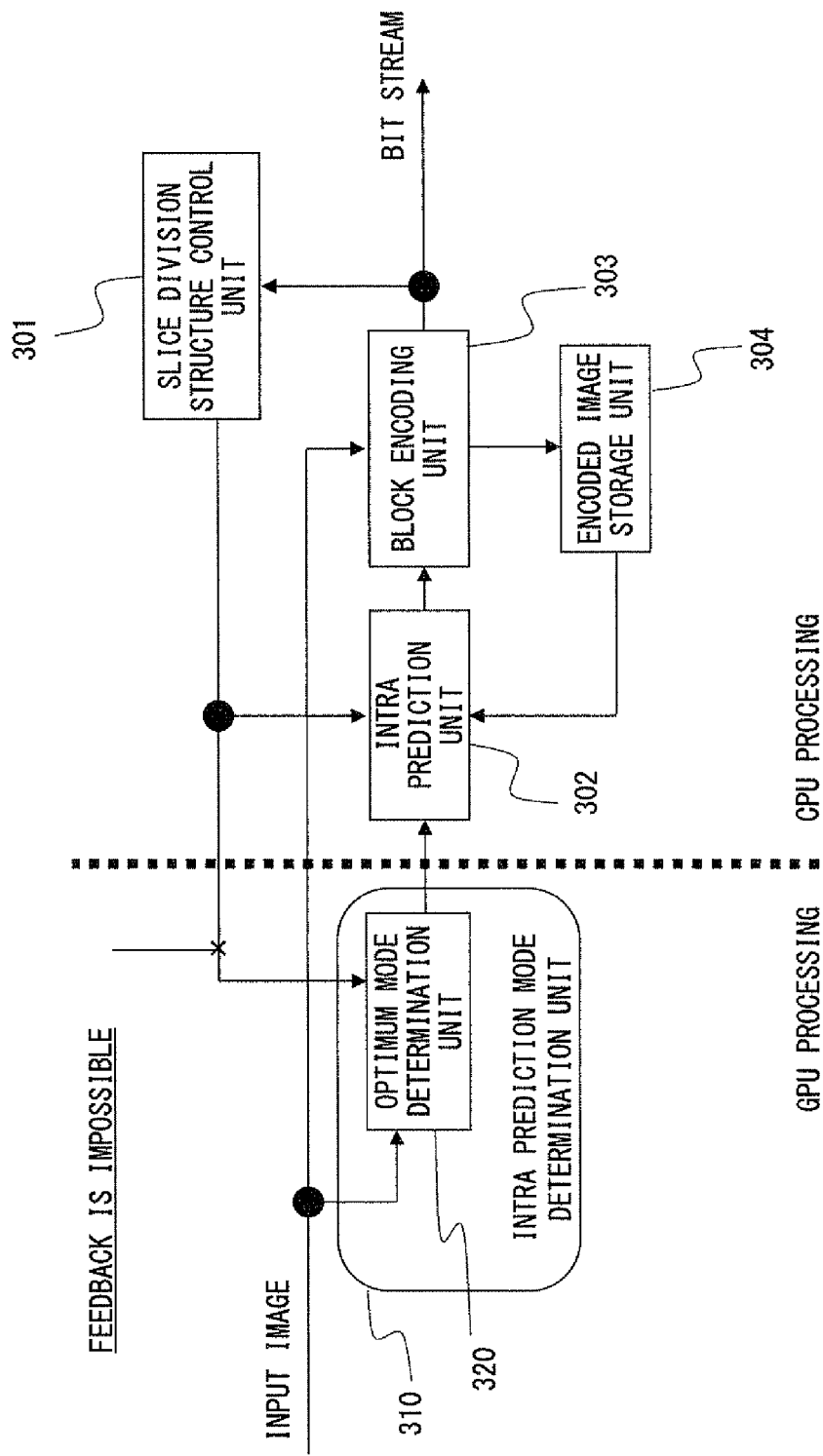
FIG. 13 is a diagram for explaining a problem of a related art technique.

As in the case of FIG. 11, the processing configuration for the moving image encoding apparatus 600 is limited to that when the intra mode, i.e., the intra prediction image is selected. A subtraction unit 113, an integer transform unit 106, a quantization unit 107, an inverse quantization unit 108, an inverse discrete integer transform unit 109, an addition unit 114, and a variable-length coding unit 110, each of which is provided in a moving image encoding apparatus 100 shown in FIG. 8, are integrated into the block encoding unit 680. Specifically, the intra prediction unit 670 creates an intra prediction image P0 based on intra prediction mode information R, the slice division structure S supplied from the slice division structure control unit 650, and an encoded image stored in the encoded image storage unit 690, and outputs the created image to the block encoding unit 680. The slice division structure S will be described later together with the operation of the slice division structure control unit 650. The block encoding unit 680 outputs, to the encoded image storage unit 690, an encoded image P1 obtained by performing encoding for each MB. At the same time, the block encoding unit 680 further performs variable-length coding on the encoded image P1 to obtain the bit stream BSM as the encoding result and outputs the obtained bit stream. The encoded image storage unit 690 temporarily stores the encoded image P1 from the block encoding unit 680 and supplies it to the intra prediction unit 670.

The intra prediction unit 670, the block encoding unit 680, and the encoded image storage unit 690 of the moving image encoding apparatus 600 perform processes similar to those of an intra prediction unit 302, a block encoding unit 303, and an encoded image storage unit 304, respectively, of a moving image encoding apparatus 300 shown in FIG. 11, and thus a detailed description thereof is omitted.

The slice division structure control unit 650, which determines the slice division structure, can dynamically change the slice division structure. In the moving image encoding apparatus 600 of this exemplary embodiment, the slice division structure control unit 650 monitors the data size of the bit stream BSM, and determines the slice division structure such that the data size for one slice is equal to or smaller than a predetermined threshold. This predetermined threshold is set to a value smaller than a packet size for transmission of the bit stream BSM, for example. Further, the slice division structure control unit 650 determines the slice division structure S from among n (n≥2) slice division structures (S1, S2, . . . , and Sn) which can be assumed.

The slice division structure control unit 650 outputs the determined slice division structure S to the selection unit 660 and the intra prediction unit 670, respectively.

The selection unit 660 selects the intra prediction mode information R from among n pieces of intra prediction mode information (R1, R2, . . . , and Rn) transmitted for the picture P from the intra prediction mode determination unit 610, and supplies the selected intra prediction mode information to the intra prediction unit 670. As described in detail later, the pieces of intra prediction mode information R1, R2, . . . , and Rn respectively correspond to the n slice division structures S1, S2, . . . , and Sn that can be determined by the slice division structure control unit 650, and the selection unit 660 selects, as the intra prediction mode information R, the information corresponding to the slice division structure S, which is determined by the slice division structure control unit 650, from among the pieces of intra prediction mode information R1, R2, . . . , and Rn.

The intra prediction mode determination unit 610 corresponds to the pre-stage processing unit, and includes n optimum mode determination units 62 (62a, 62b, . . . , and 62n), a slice division structure listing unit 630, and a transmission unit 640.

The slice division structure listing unit 720 lists a plurality of slice division structures that can be assumed based on the position within the picture P of each macroblock to be processed in the picture P, i.e., a list of slice division structures S1, S2, . . . , and Sn that can be determined by the slice division structure control unit 650, and outputs them to the n optimum mode determination units 62a, 62b, . . . , and 62n, respectively.

As described above, the number of selectable intra prediction modes and the operation of intra prediction vary depending on the positional relationship between the slice boundary and the macroblock to be processed. Accordingly, the result of the intra prediction mode determination, i.e., the intra prediction mode to be selected, can vary depending on the position of the macroblock and the slice division structure. Each optimum mode determination unit of the intra prediction mode determination unit 610 determines an optimum mode (for example, an intra prediction mode with the highest encoding efficiency) of the macroblock based on the position of the macroblock and the slice division structure supplied from the slice division structure listing unit 630, and outputs, to the transmission unit 640, the intra prediction mode information indicating the determined intra prediction mode.

Figure 4:
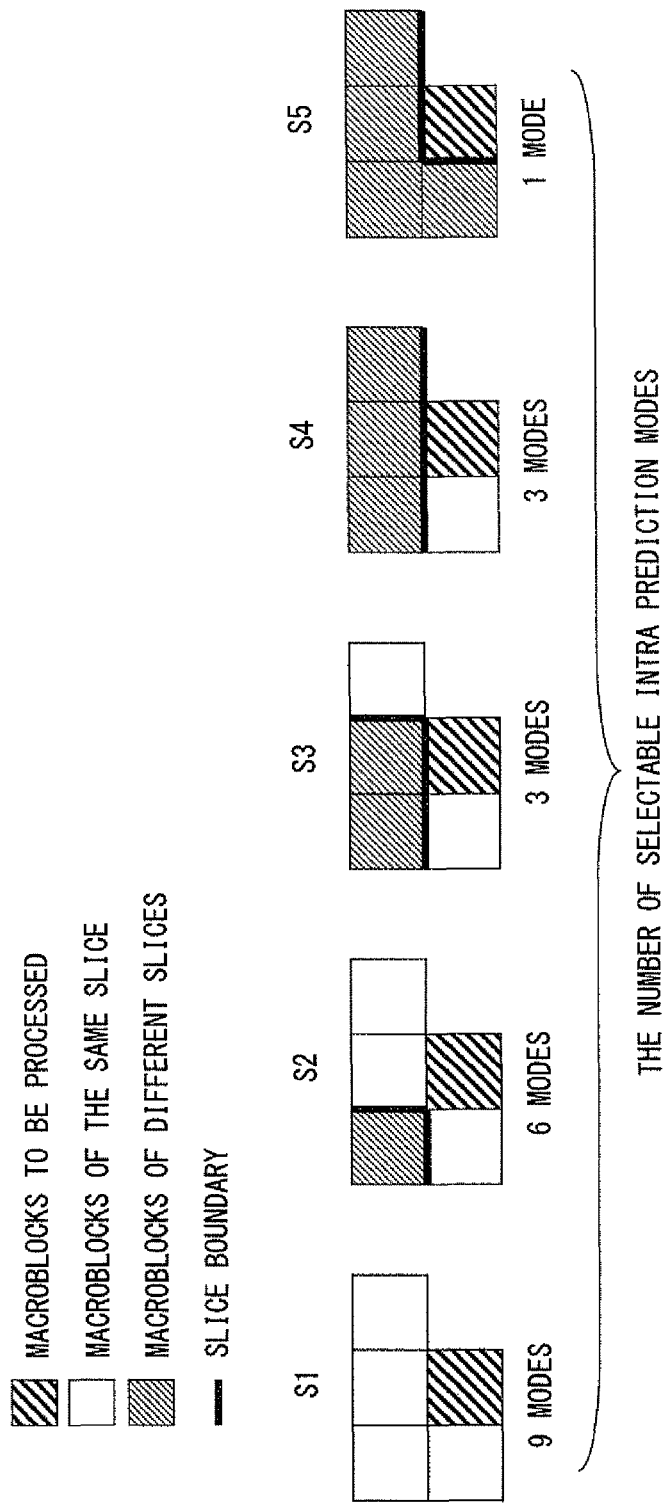
FIG. 4 is a diagram showing an example of the relationship between a slice structure and the number of selectable intra prediction modes.
Figure 10:
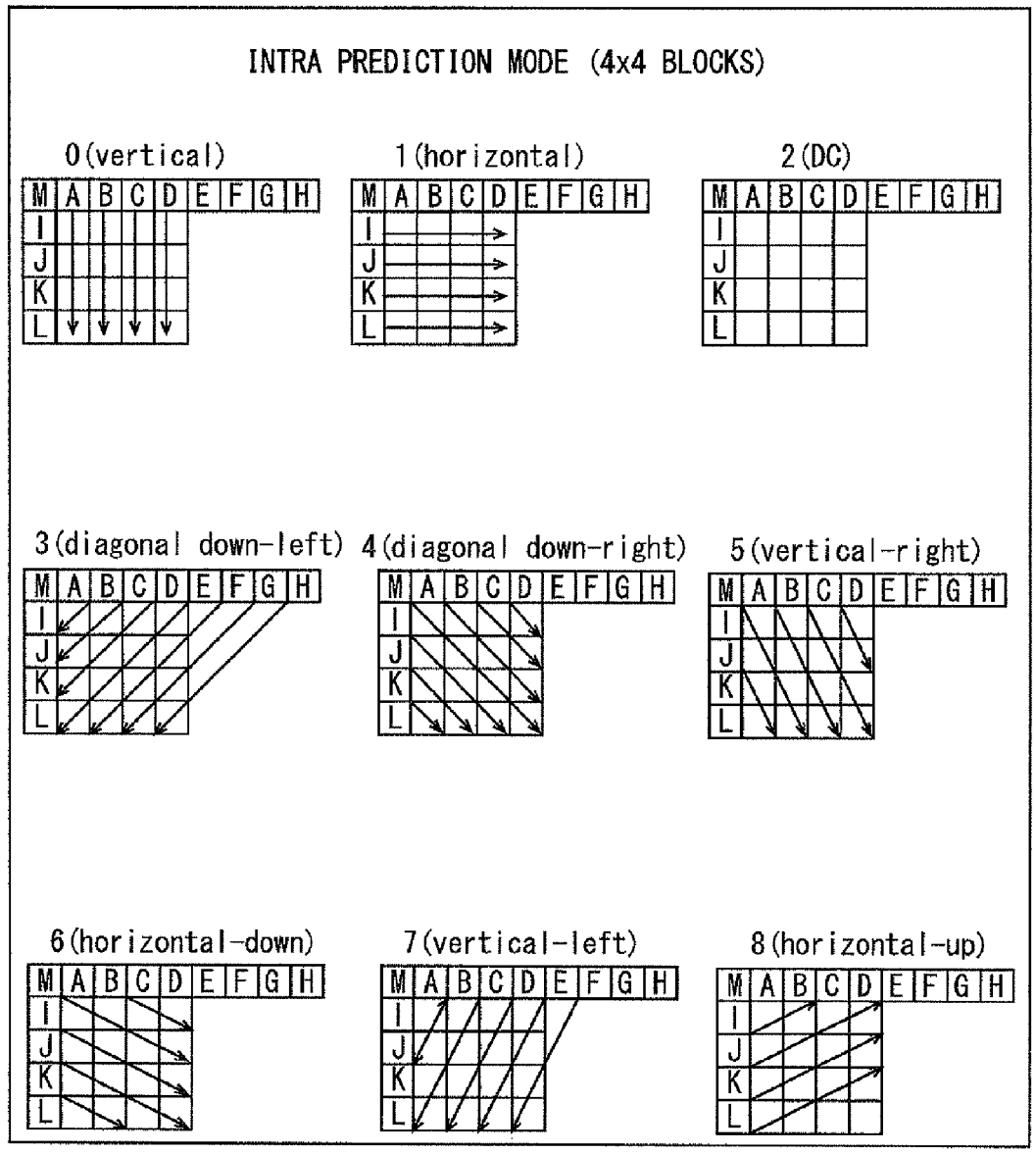
FIG. 10 is a diagram showing an example of intra prediction modes.

FIG. 4 shows examples of the plurality of slide division structures and the number of intra prediction modes that can be selected in each example. Four peripheral macroblocks, i.e., left, upper-left, upper, and upper-right macroblocks to be processed, are relevant to the intra prediction, and the operation of intra prediction varies depending on whether these macroblocks are included in the same slice or not. For example, in the case of the structure S1 shown in FIG. 4, the four peripheral macroblocks are included in the same slice, so all nine modes shown in FIG. 10 can be used. In the case of the structure S2, the upper-left macroblock belongs to a different slice, so the macroblock cannot be used as a prediction source of the intra prediction. As a result, the modes 4, 5, and 6, in which the upper-left macroblock is used, among the nine modes shown in FIG. 10, cannot be used, and thus the number of selectable intra prediction modes is six.

Accordingly, the intra prediction mode information output from each optimum mode determination unit 62a of the intra prediction mode determination unit 610 may vary depending on the slice division structure.

The transmission unit 640 collectively outputs, to the selection unit 660, the pieces of intra prediction mode information, which are output from the optimum mode determination units 62a, 62b, . . . , 62n, for each screen (i.e., each picture). FIG. 5 illustrates an example of the intra prediction mode information output to the selection unit 660 from the transmission unit 640 of the intra prediction mode determination unit 610. In this example, assume that n is 5.

As shown in the figure, for example, in the case of a macroblock N, when the structure S1 is used as the slice division structure, the mode 4 is determined as the optimum intra prediction mode, and when the slice division structures S2 and S5 are used as the slice division structure, the mode 2 is determined as the optimum intra prediction mode. Further, when the structures S3 and S4 are used as the slice division structure, the mode 1 is determined as the optimum intra prediction mode.

The selection unit 660 selects the intra prediction mode information (intra prediction mode information R) corresponding to the slice division structure S, which is actually determined by the slice division structure control unit 650, from among the pieces of intra prediction mode information as shown in FIG. 5, and outputs the selected intra prediction mode information to the intra prediction unit 670. For example, when the slice division structure S determined by the slice division structure control unit 650 corresponds to S1 at the position of the macroblock N, the selection unit 701 selects the mode 4 for the macroblock N, and when the slice division structure S corresponds to S1 at the position of a macroblock (N+1), the selection unit 701 selects the mode 6 for the macroblock (N+1).

The intra prediction unit 670 performs intra prediction by using the intra prediction mode information R selected by the selection unit 660, and obtains the intra prediction image P0 and outputs it to the block encoding unit 680.

The block encoding unit 680 and the encoded image storage unit 690 operate in the same manner as the block encoding unit 303 and the encoded image storage unit 304, respectively, in the moving image encoding apparatus 300 shown in FIG. 11.

The moving image encoding apparatus 600 according to this exemplary embodiment is an embodiment of the moving image encoding apparatus 500 shown in FIG. 2 for explaining the principle of the present invention. The moving image encoding apparatus 600 can exert all the effects obtained by the moving image encoding apparatus 500 and can avoid deterioration in image quality and efficiency even when the slice division structure is dynamically changed during encoding of a moving image.

Second Exemplary Embodiment

Figure 6:
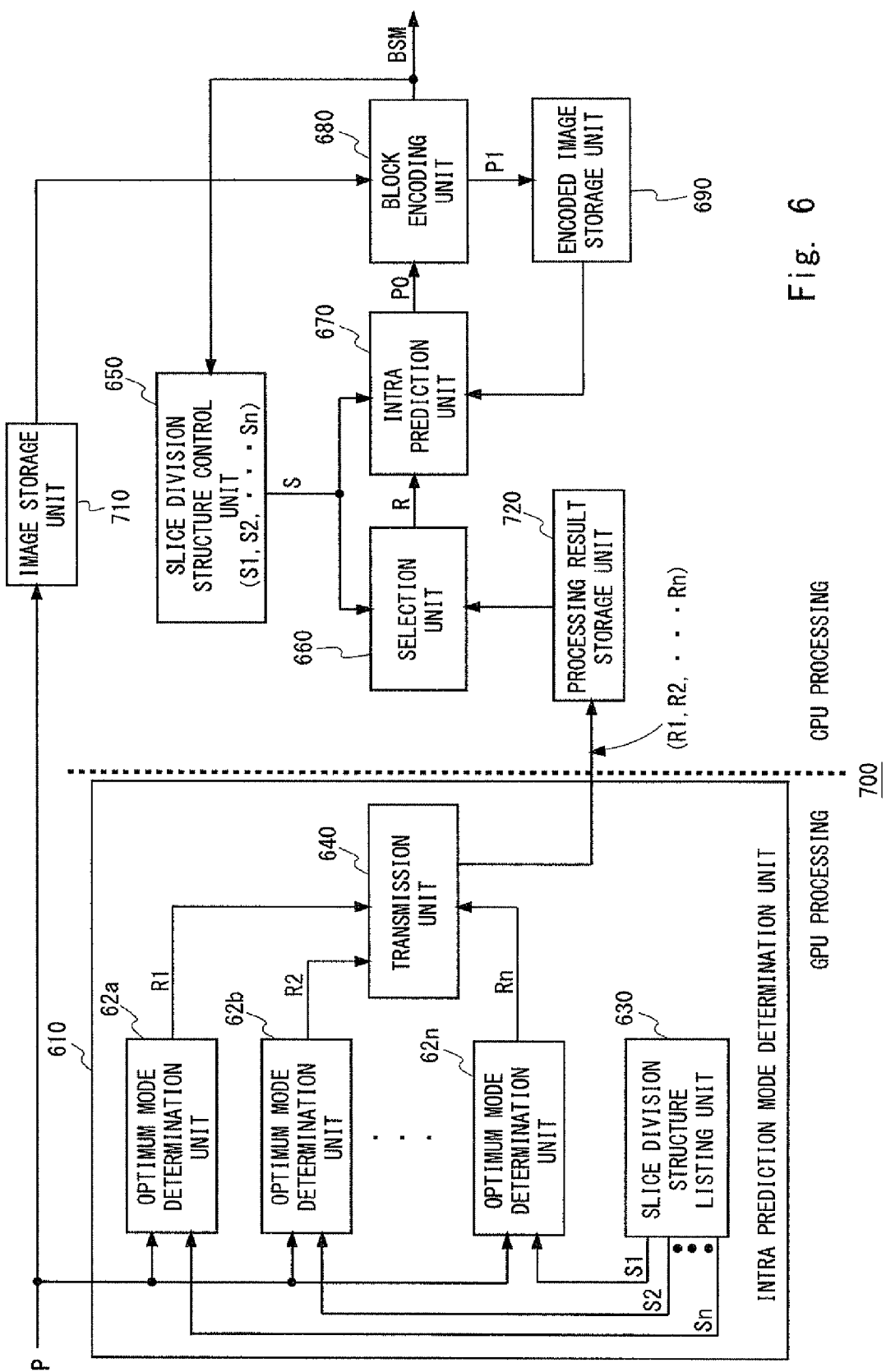
FIG. 6 is a diagram showing a moving image encoding apparatus according to a second exemplary embodiment of the present invention.

FIG. 6 shows a moving image encoding apparatus 700 according to a second exemplary embodiment of the present invention. The moving image encoding apparatus 700 further includes an image storage unit 710 and a processing result storage unit 720, and has a configuration similar to that of the moving image encoding apparatus 600 shown in FIG. 3, except that the intra prediction mode determination unit 610 and other functional blocks can process different pictures in parallel.

In the moving image encoding apparatus 700, the image storage unit 710 temporarily stores at least one subsequent picture during processing of the current picture by the post-stage processing unit (which corresponds to the block encoding unit 680 in this case), and supplies the block encoding unit 680 with the next picture temporarily stored, after completion of the processing of the current picture by the block encoding unit 680. The processing result storage unit 720 temporarily stores the processing results (intra prediction mode information R1, R2, ..., and Rn) for each slice division structure for the at least one picture transmitted from the transmission unit 640, and supplies the selection unit 660 with the processing result of the next picture temporarily stored, after completion of the processing of the current picture by the block encoding unit 680.

The provision of the image storage unit 710 and the processing result storage unit 720 enables the intra prediction mode determination unit 610 and the block encoding unit 680 to process different pictures in parallel. The details thereof will be described with reference to FIG. 7.

Figure 7:
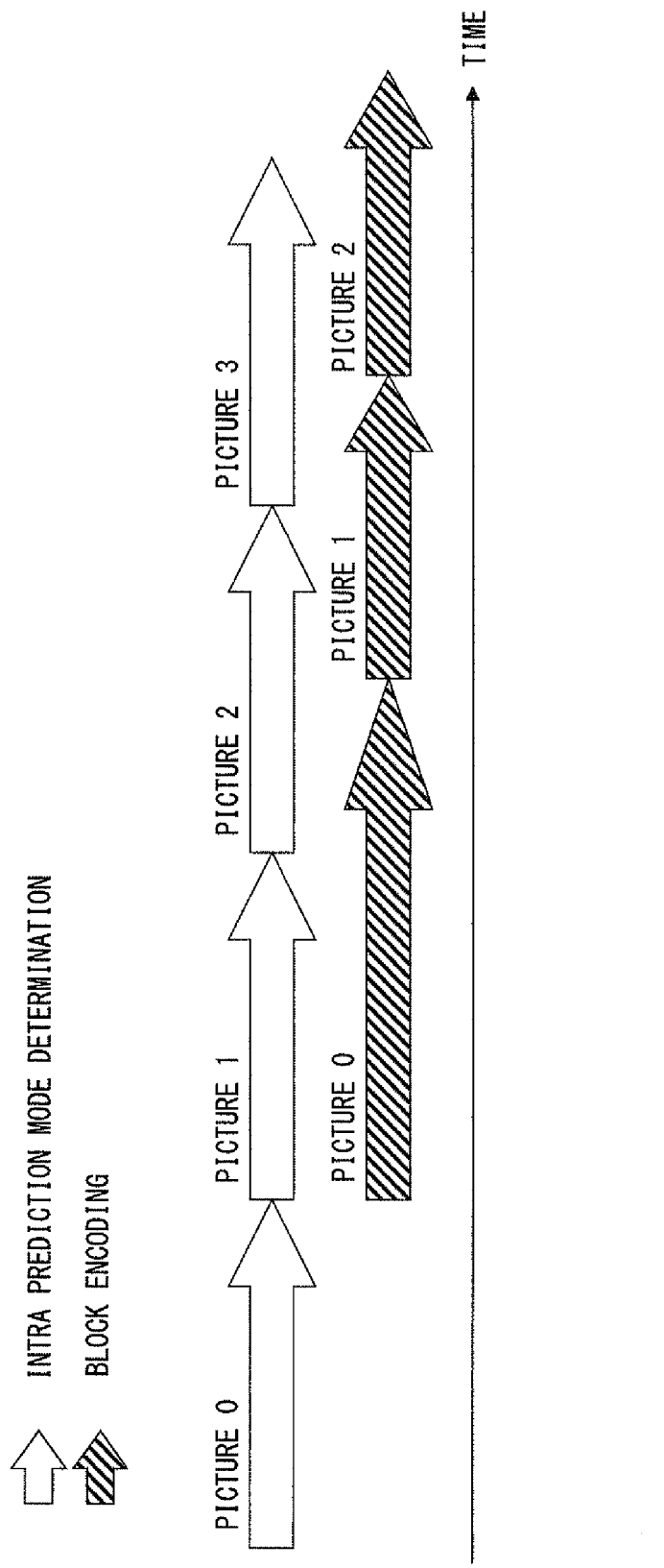
FIG. 7 is a timing diagram showing an example of the timing relationship between intra prediction mode determination processing and block encoding processing in the moving image encoding apparatus shown in FIG. 6.

FIG. 7 is a timing diagram showing an example of the operation timing of each of the intra prediction mode determination unit 610 and the block encoding unit 680. First, a picture 0 is input to the intra prediction mode determination unit 610. Each optimum mode determination unit of the intra prediction mode determination unit 610 obtains intra prediction mode information on each MB of the picture 0 in accordance with the slice division structure supplied from the slice division structure listing unit 630, and outputs the obtained information to the transmission unit 640. The transmission unit 640 collectively outputs, to the processing result storage unit 720, the pieces of intra prediction mode information for each slice division structure of the picture 0. The picture 0 is stored in the image storage unit 710.

Thus, the processing for the picture 0 by the intra prediction mode determination unit 610 is completed, and the post-stage processing unit including the block encoding unit 680 performs encoding of each MB of the picture 0 by using the intra prediction mode information (R1, R2, ..., Rn) on the picture 0 stored in the slice division structure control unit 65. In parallel, the intra prediction mode determination unit 610 performs processing for the next picture (picture 1).

Specifically, when the post-stage processing unit including the block encoding unit 680 processes the picture 0, the image storage unit 710 stores the picture 0. Further, the intra prediction mode determination unit 610 serving as the pre-stage processing unit performs processing for the picture 1, and transmits the processing result to the processing result storage unit 720 upon completion of the processing. The picture 1 is stored in the image storage unit 710.

In this manner, the moving image encoding apparatus 700 according to the second exemplary embodiment of the present invention can obtain the same effects as those of the moving image encoding apparatus 600 according to the first exemplary embodiment shown in FIG. 1, and can execute the intra prediction mode determination and the block encoding processing in parallel on different pictures, thereby further improving the efficiency of the entire encoding processing.

As shown in the example of FIG. 7, even when it takes a long time to perform block encoding processing on the picture 0, for example, the intra prediction mode determination processing for the subsequent picture can be started and processing resources are allowed to effectively operate without the need to wait for the completion of the block encoding processing.

The present invention has been described above with reference to exemplary embodiments, but the present invention is not limited to the above exemplary embodiments. The configuration and details of the present invention can be modified in various manners which can be understood by those skilled in the art within the scope of the invention.

For example, the first and second exemplary embodiments illustrate an example in which the technique according to the present invention is applied to the H.264 encoding system. However, the technique according to the present invention can also be applied to any other encoding system, such as VC-1, and encoding systems that are not included in the moving image encoding systems of the international standards.

The first and second exemplary embodiments illustrate an example in which "pre-stage processing" and "post-stage processing" in the technique of the present invention correspond to "intra prediction mode determination" and "intra prediction", respectively, for ease of understanding. However, the processing can be applied not only to the intra prediction, but also to various processings in which the operation varies depending on the slice division structure.

While FIG. 2 illustrates an example in which five types of slice division structures are listed, the types of slice division structures are not limited to those shown in FIG. 2. Only some of the five types may be used, or a larger number of types of slice division structures may be used.

The first and second exemplary embodiments illustrate an example in which processing with a large load is off-loaded to the GPU. However, the processing is off-loaded not only to the GPU, but may be off-loaded to another CPU, or a device other than the CPU that performs the post-stage processing, such as an FPGA or a dedicated LSI circuit.

The above embodiments illustrate the case where the GPU collectively processes, for the moving image encoding apparatus according to the first and second exemplary embodiments, the processing results for one picture during one communication with the CPU. However, the processing results may be transmitted to the CPU so that multiple communications are established in a unit smaller than one picture.

This application is based upon and claims the benefit of priority from Japanese patent application No. 2011-138120, filed on Jun. 22, 2011, the disclosure of which is incorporated herein in its entirety by reference.

REFERENCE SIGNS LIST

100 MOVING IMAGE ENCODING APPARATUS
101 MOTION ESTIMATION UNIT
102 MOTION COMPENSATION UNIT
103 INTRA PREDICTION MODE DETERMINATION UNIT
104 INTRA PREDICTION UNIT
105 SELECTION UNIT
106 INTEGER TRANSFORM UNIT
107 QUANTIZATION UNIT
108 INVERSE QUANTIZATION UNIT
109 INVERSE DISCRETE INTEGER TRANSFORM UNIT
110 VARIABLE-LENGTH CODING UNIT
111 DEBLOCKING FILTER UNIT
112 FRAME BUFFER
113 SUBTRACTION UNIT
114 ADDITION UNIT
200 MOVING IMAGE ENCODING APPARATUS
203 INTRA PREDICTION MODE DETERMINATION UNIT
300 MOVING IMAGE ENCODING APPARATUS
301 SLICE DIVISION STRUCTURE CONTROL UNIT
302 INTRA PREDICTION UNIT
303 BLOCK ENCODING UNIT
304 ENCODED IMAGE STORAGE UNIT
310 INTRA PREDICTION MODE DETERMINATION UNIT
320 OPTIMUM MODE DETERMINATION UNIT
400 MOVING IMAGE ENCODING APPARATUS
410 PRE-STAGE PROCESSING UNIT
420 POST-STAGE PROCESSING UNIT
430 SLICE DIVISION STRUCTURE CONTROL UNIT
500 MOVING IMAGE ENCODING APPARATUS
600 MOVING IMAGE ENCODING APPARATUS
0610 INTRA PREDICTION MODE DETERMINATION UNIT
62$a$-62$n$ OPTIMUM MODE DETERMINATION UNIT
630 SLICE DIVISION STRUCTURE LISTING UNIT
640 TRANSMISSION UNIT
650 SLICE DIVISION STRUCTURE CONTROL UNIT
660 SELECTION UNIT
670 INTRA PREDICTION UNIT
680 BLOCK ENCODING UNIT
690 ENCODED IMAGE STORAGE UNIT
700 MOVING IMAGE ENCODING APPARATUS
710 IMAGE STORAGE UNIT
720 PROCESSING RESULT STORAGE UNIT
Bsm BIT STREAM
p PICTURE
P0 INTRA PREDICTION IMAGE
p1 ENCODED IMAGE
R INTRA PREDICTION MODE INFORMATION
R1-Rn INTRA PREDICTION MODE INFORMATION
S SLICE DIVISION STRUCTURE
S1-Sn SLICE DIVISION STRUCTURE

What is claimed is:

1. A moving image encoding apparatus that encodes each picture by dividing the picture into a plurality of slices, the moving image encoding apparatus comprising:
   slice division structure control means for determining a slice division structure indicating a division position for dividing the picture into a plurality of slices;
   pre-stage processing means for performing pre-stage processing that can yield different processing results for different slice division structures, the pre-stage processing being processing for a pre-stage portion for encoding the picture; and
   post-stage processing means for performing post-stage processing based on the processing result of the pre-stage processing means to obtain an encoding result, the post-stage processing being processing for a post-stage portion for the encoding, wherein
   the pre-stage processing means performs the pre-stage processing for each of a plurality of slice division structures that can be determined by the slice division structure control means, and obtains processing results for each of the plurality of slice division structures, and
   the post-stage processing means selects, from among processing results for each of the plurality of slice division structures obtained by the pre-stage processing means, a processing result matching a slice division structure determined by the slice division structure control means, and performs the post-stage processing based on the selected processing result.

2. The moving image encoding apparatus according to claim 1, wherein the pre-stage processing includes processing for determining an intra prediction mode, and the post-stage processing includes intra prediction processing.

3. The moving image encoding apparatus according to claim 2, wherein
   the slice division structure control means and the post-stage processing means are provided in a CPU (Central Processing Unit), and
   the pre-stage processing means is provided outside the CPU, and collectively transmits, for each picture, the processing results for each of the plurality of slice division structures to the post-stage processing means.

4. The moving image encoding apparatus according to claim 3, wherein the slice division structure control means dynamically determines the slice division structure based on the encoding result obtained by the post-stage processing means.

5. The moving image encoding apparatus according to claim 3, wherein the slice division structure control means monitors a data size of a bit stream as the encoding result, and determines the slice division structure such that the data size of one slice is equal to or smaller than a predetermined threshold.

6. The moving image encoding apparatus according to claim 3, further comprising:
   image storage means for temporarily storing at least one subsequent picture during processing of a current picture by the post-stage processing means; and
   processing result storage means for temporarily storing processing results for each of a plurality of slice division structures obtained by the pre-stage processing means for the at least one picture.

7. The moving image encoding apparatus according to claim 1, wherein
the slice division structure control means and the post-stage processing means are provided in a CPU (Central Processing Unit), and
the pre-stage processing means is provided outside the CPU, and collectively transmits, for each picture, the processing results for each of the plurality of slice division structures to the post-stage processing means.

8. The moving image encoding apparatus according to claim 7, wherein the slice division structure control means dynamically determines the slice division structure based on the encoding result obtained by the post-stage processing means.

9. The moving image encoding apparatus according to claim 7, wherein the slice division structure control means monitors a data size of a bit stream as the encoding result, and determines the slice division structure such that the data size of one slice is equal to or smaller than a predetermined threshold.

10. The moving image encoding apparatus according to claim 7, further comprising:
image storage means for temporarily storing at least one subsequent picture during processing of a current picture by the post-stage processing means; and
processing result storage means for temporarily storing processing results for each of a plurality of slice division structures obtained by the pre-stage processing means for the at least one picture.

11. The moving image encoding apparatus according to claim 1, wherein the slice division structure control means dynamically determines the slice division structure based on the encoding result obtained by the post-stage processing means.

12. The moving image encoding apparatus according to claim 11, further comprising:
image storage means for temporarily storing at least one subsequent picture during processing of a current picture by the post-stage processing means; and
processing result storage means for temporarily storing processing results for each of a plurality of slice division structures obtained by the pre-stage processing means for the at least one picture.

13. The moving image encoding apparatus according to claim 2, wherein the slice division structure control means dynamically determine the slice division structure based on the encoding result obtained by the post-stage processing means.

14. The moving image encoding apparatus according to claim 1, further comprising:
image storage means for temporarily storing at least one subsequent picture during processing of a current picture by the post-stage processing means; and
processing result storage means for temporarily storing processing results for each of a plurality of slice division structures obtained by the pre-stage processing means for the at least one picture.

15. The moving image encoding apparatus according to claim 2, further comprising:
image storage means for temporarily storing at least one subsequent picture during processing of a current picture by the post-stage processing means; and
processing result storage means for temporarily storing processing results for each of a plurality of slice division structures obtained by the pre-stage processing means for the at least one picture.

16. A moving image encoding method that encodes each picture by dividing the picture into a plurality of slices, the moving image encoding method comprising:
performing slice division structure control processing for determining a slice division structure indicating a division position for dividing the picture into a plurality of slices;
performing pre-stage processing that can yield different processing results for different slice division structures, for each of a plurality of slice division structures that can be determined by the slice division structure processing, to obtain processing results for each of the plurality of slice division structures, the pre-stage processing being processing for a pre-stage portion for encoding the picture; and
selecting, from among the processing results for each of the plurality of slice division structures obtained by the pre-stage processing, a processing result matching a slice division structure determined by the slice division structure control processing, and performing post-stage processing based on the selected processing result to obtain an encoding result, the post-stage processing being processing for a post-stage portion for encoding the picture.

17. The moving image encoding method according to claim 16, wherein
the pre-stage processing includes processing for determining an intra prediction mode, and
the post-stage processing includes intra prediction processing.

18. The moving image encoding method according to claim 17, wherein
the slice division structure control processing and the post-stage processing are executed by a CPU (Central Processing Unit),
the pre-stage processing is executed by a device other than the CPU, and
the processing results for each of the plurality of slice division structures are collectively transmitted, for each picture, to the CPU from a device other than the CPU.

19. The moving image encoding method according to claim 16, wherein
the slice division structure control processing and the post-stage processing are executed by a CPU (Central Processing Unit),
the pre-stage processing is executed by a device other than the CPU, and
the processing results for each of the plurality of slice division structures are collectively transmitted, for each picture, to the CPU from a device other than the CPU.

20. A non-transitory computer-readable medium storing a program for causing a computer to execute moving image encoding processing for encoding each picture by dividing the picture into a plurality of slices, the moving image encoding processing comprising:
performing slice division structure control processing for determining a slice division structure indicating a division position for dividing the picture into a plurality of slices;
performing pre-stage processing that can yield different processing results for different slice division structures, for each of a plurality of slice division structures that can be determined by the slice division structure processing, to obtain processing results for each of the plurality of slice division structures, the pre-stage processing being processing for a pre-stage portion for encoding the picture; and selecting, from among the processing results for each of the plurality of slice division structures obtained by the pre-stage processing, a processing result matching a slice division structure determined by the slice division structure control processing, and performing post-stage processing based on the selected processing result to obtain an encoding result, the post-stage processing being processing for a post-stage portion for encoding the picture.

21. A moving image encoding apparatus that encodes each picture by dividing the picture into a plurality of slices, the moving image encoding apparatus comprising:

a slice division structure controller configured to determine a slice division structure indicating a division position for dividing the picture into a plurality of slices;

a pre-stage processor configured to perform pre-stage processing that can yield different processing results for different slice division structures, the pre-stage processing being processing for a pre-stage portion for encoding the picture; and a post-stage processor configured to perform post-stage processing based on the processing result of the pre-stage processor to obtain an encoding result, the post-stage processing being processing for a post-stage portion for the encoding, wherein the pre-stage processor performs the pre-stage processing for each of a plurality of slice division structures that can be determined by the slice division structure controller, and obtains processing results for each of the plurality of slice division structures, and the post-stage processor selects, from among processing results for each of the plurality of slice division structures obtained by the pre-stage processor, a processing result matching a slice division structure determined by the slice division structure controller, and performs the post-stage processing based on the selected processing result.

* * * * *